(12) United States Patent
Battagin et al.

(10) Patent No.: US 7,558,799 B2
(45) Date of Patent: Jul. 7, 2009

(54) METHOD, SYSTEM, AND APPARATUS FOR DISCOVERING AND CONNECTING TO DATA SOURCES

(75) Inventors: Daniel C. Battagin, Redmond, WA (US); Johnny S. Campbell, Seattle, WA (US); Robert G. Hawking, Seattle, WA (US); Eran Megiddo, Bellevue, WA (US); Liviu Asnash, Redmond, WA (US); Alexander Martynov, Sammamish, WA (US); Brian L. Welcker, Seattle, WA (US); Ira Levin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 10/858,190

(22) Filed: Jun. 1, 2004

(65) Prior Publication Data

US 2005/0278307 A1  Dec. 15, 2005

(51) Int. Cl.
*G06F 17/30* (2006.01)
(52) U.S. Cl. .................. 707/100; 707/3; 707/104.1; 709/223
(58) Field of Classification Search .............. None
See application file for complete search history.

(56) References Cited

U.S. PATENT DOCUMENTS

| | | | | |
|---|---|---|---|---|
| 5,893,107 A | 4/1999 | Chan et al. | ................. | 707/103 |
| 5,999,711 A * | 12/1999 | Misra et al. | ................. | 726/4 |
| 6,061,692 A | 5/2000 | Thomas et al. | ................. | 707/200 |
| 6,246,409 B1 | 6/2001 | Veghte et al. | ................. | 345/356 |
| 6,286,047 B1 | 9/2001 | Ramanathan et al. | ....... | 709/224 |
| 6,327,608 B1 | 12/2001 | Dillingham | ................. | 709/203 |
| 6,356,901 B1 | 3/2002 | MacLeod et al. | ................. | 707/6 |
| 6,360,230 B1 | 3/2002 | Chan et al. | ................. | 707/103 |
| 6,539,383 B2 | 3/2003 | Charlet et al. | ................. | 707/10 |
| 6,615,231 B1 | 9/2003 | Deen et al. | ................. | 709/201 |
| 6,640,223 B1 | 10/2003 | Jones et al. | ................. | 707/3 |
| 6,886,009 B2 * | 4/2005 | Jeng et al. | ................. | 707/3 |
| 6,971,059 B1 * | 11/2005 | Knipe et al. | ........... | 715/500.01 |
| 7,107,284 B1 * | 9/2006 | Betz et al. | ................. | 707/104.1 |
| 2002/0133504 A1 * | 9/2002 | Vlahos et al. | ............. | 707/104.1 |
| 2003/0074358 A1 * | 4/2003 | Sarbaz et al. | ................. | 707/10 |
| 2003/0212960 A1 * | 11/2003 | Shaughnessy et al. | ....... | 715/526 |
| 2005/0055325 A1 * | 3/2005 | Dutt et al. | ................. | 707/1 |

FOREIGN PATENT DOCUMENTS

| | | | |
|---|---|---|---|
| DE | 100 56 519 A1 | 5/2002 | |
| DE | 100 31 006 A1 | 7/2002 | |

* cited by examiner

*Primary Examiner*—Charles Rones
*Assistant Examiner*—Yuk Ting Choi
(74) *Attorney, Agent, or Firm*—Merchant & Gould P.C.

(57) ABSTRACT

A method, system, and apparatus for discovering and connecting to data sources are provided. A system is provided that includes a server computer operative to maintain a centrally managed repository of data connection definitions. A client computer is also provided including an application program capable of consuming data from a data source. When a request is received by the application to connect to a data source, a list of available sources is retrieved from the server computer. If one of the data sources in the list is selected, a data connection file is retrieved and utilized to connect to the data source. If a report is opened by the application that includes a reference to a data source, the repository is utilized to confirm the connection to the data source.

9 Claims, 5 Drawing Sheets

METHOD, SYSTEM, AND APPARATUS FOR DISCOVERING AND CONNECTING TO DATA SOURCES

BACKGROUND OF THE INVENTION

Generating reports is one of the tasks performed most frequently by users of spreadsheet application programs. In order to author a report, access to a data source located on an external computer system is often needed. For instance, in order to obtain the data necessary for a particular report, it may be necessary to access data contained in a remote database or an on-line analytical processing ("OLAP") cube.

In order to access such a data source, a network connection must be created to the source of the data. To create such a connection, it is necessary to know the identity of the server computer the data is contained on, the identity of the database within the server computer, and often other knowledge specific to databases or data technologies. In many cases, however, the report author does not have quick access to this information. Therefore, it may be very difficult for a user to locate and connect to a data source.

Once a user is finally able to connect to a data source, the information needed to connect to the data source may be captured and saved in a data connection file for future use. However, there is no easy way for one computer user to share a data connection file with a multitude of other users. Therefore, in many cases, each user needing access to the same data source must independently locate or create the information necessary to connect to the data source on their own. This can be frustrating and time consuming for each user. When an organization has a large number of analysts needing to connect to the same data source, this can cause a great deal of inefficiency.

When reports are authored with connections to external data sources, information is typically stored within the report that describes the connection to the data source. In this manner, the connection to the data source can be reestablished when the report is subsequently opened. However, if the location of the data source changes or the data source is disabled, the report will identify an incorrect location or other parameters (such as a names, table names, catalog names, etc.) for the data source. When the report is opened, a user may be confused as to why the data source is unavailable. Moreover, if an organization utilizes a large number of reports that reference a modified data source, it may be difficult to track down each of the reports and modify the reports to reference the new location of the data source. Reports connecting to the data source are useless until someone locates the reports and manually updates the references to the data source.

The use of external data sources can also be difficult for system administrators. In particular, system administrators currently do not have a way to centrally define connections to trusted data sources and to make the connections available to end users. Moreover, there is no easy way for a system administrator to make certain data sources accessible to one group of users and not accessible to another group of users.

It is with respect to these considerations and others that the various embodiments of the present invention have been made.

BRIEF SUMMARY OF THE INVENTION

In accordance with the present invention, the above and other problems are solved by a method, system, and apparatus for discovering and connecting to data sources. Utilizing the various aspects of the invention, quick access may be had to the information necessary to connect to a data source, the data may be easily published and shared with other users, may be modified in a manner that does not require a change to reports utilizing the data source, and the data source connections may be easily administered from a central location.

According to one aspect of the invention, a system is provided for assisting in the discovery of available data sources. The system includes a server computer operative to maintain a centrally managed repository of data connection definitions. Each of the data connection definitions includes a data connection file that stores connection information for establishing a connection to the data source, such as a network address and a database location for the data source. Each data connection definition also includes one or more metadata properties describing the connection. For instance, the properties may include a name, a text description, searchable keywords, instructions for obtaining credentials for the data source, and other information. Data connections may be added to the repository only by system administrators or other trusted users.

According to other aspects of the invention, the system may also include a client computer including an application program capable of consuming data from a data source. For instance, the application program may comprise a spreadsheet application program that utilizes data from a data source in performing financial analysis. The application program is operative to provide an improved user interface for locating data connections. According to this aspect of the invention, a request may be received, such as from a user, to create a connection to a data source. When such a request is received, the application is operative to transmit a request to the server computer for a list of available data sources.

In response to receiving a request from the application for a list of available data sources, the server computer is operative to search the repository for available data sources. According to aspects of the invention, the search may be limited to data sources for which a user of the application program has security privileges or limited to data sources having metadata matching filter terms provided by the user. When one or more data sources have been identified within the repository, the server computer responds to the request from the client application with a list of matching data sources.

The application program is further operative to display to a user the list of available data sources. The list of data sources may be sorted and filtered based on metadata associated with each source. When a user provides a selection of one of the data sources to connect to, the application program transmits a request to the server computer for the data connection information corresponding to the selected source. In response, the server computer returns the data connection file.

Once the data connection file has been returned to the client computer, the application program may utilize the contents of the file to establish a connection to the data source. Data may then be retrieved from the data source and utilized in calculations performed by the application program. When a report is saved by the application program, a reference may be saved within the report to the data connection file. In particular, a link may be saved within the report to the data connection file located on the server computer. The data connection file may also be embedded within the report.

When a report that includes a reference to a data source is subsequently opened by the application program, a determination is made as to whether the reference is a link or an embedded data connection file. If the reference is a link, a determination is made as to whether the connection file identified by the link is contained in the centrally managed data connection repository. If the connection file is not in the repository, the report is loaded without establishing a connection to a data source. If the connection file is not in the repository, and the connection information is cached in the report, then the connection information in the report is utilized to open a connection to the data source. If the connection file is in the repository, the connection file is copied from the repository to the client computer. The application program then utilizes the connection file to open a connection to the data source and utilizes data from the data source within the report.

If the reference to a data source in the report is determined to be an embedded data connection file, a determination is first made as to whether the data connection file also exists in the repository. If the data connection file is contained in the repository, a determination is made as to whether the information in the embedded data connection file matches the data contained in the data connection file stored in the repository. If the data matches, the contents of the embedded data connection file are utilized to open a connection to the data source.

If the data connection file is not in the repository, or if the contents of the embedded data connection file do not match the contents of the data connection file in the repository, a determination is made as to whether the report is trusted. If the report is not trusted, no connection is made to the data source. If the report is trusted, the contents of the embedded data connection file are utilized to open a connection to the data source.

According to other aspects of the invention, an application program may be provided to assist in administering the contents of the repository. In particular, data connection definitions may be added to or removed from the repository. Data connections may also be modified to change any of the associated properties, including the location of the referenced data source. Permissions may also be associated with data connection definitions so that only certain groups of users, or audiences, are authorized to view the data connection and connect to the data source.

The invention may also be implemented as a computer process, a computing system or apparatus, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
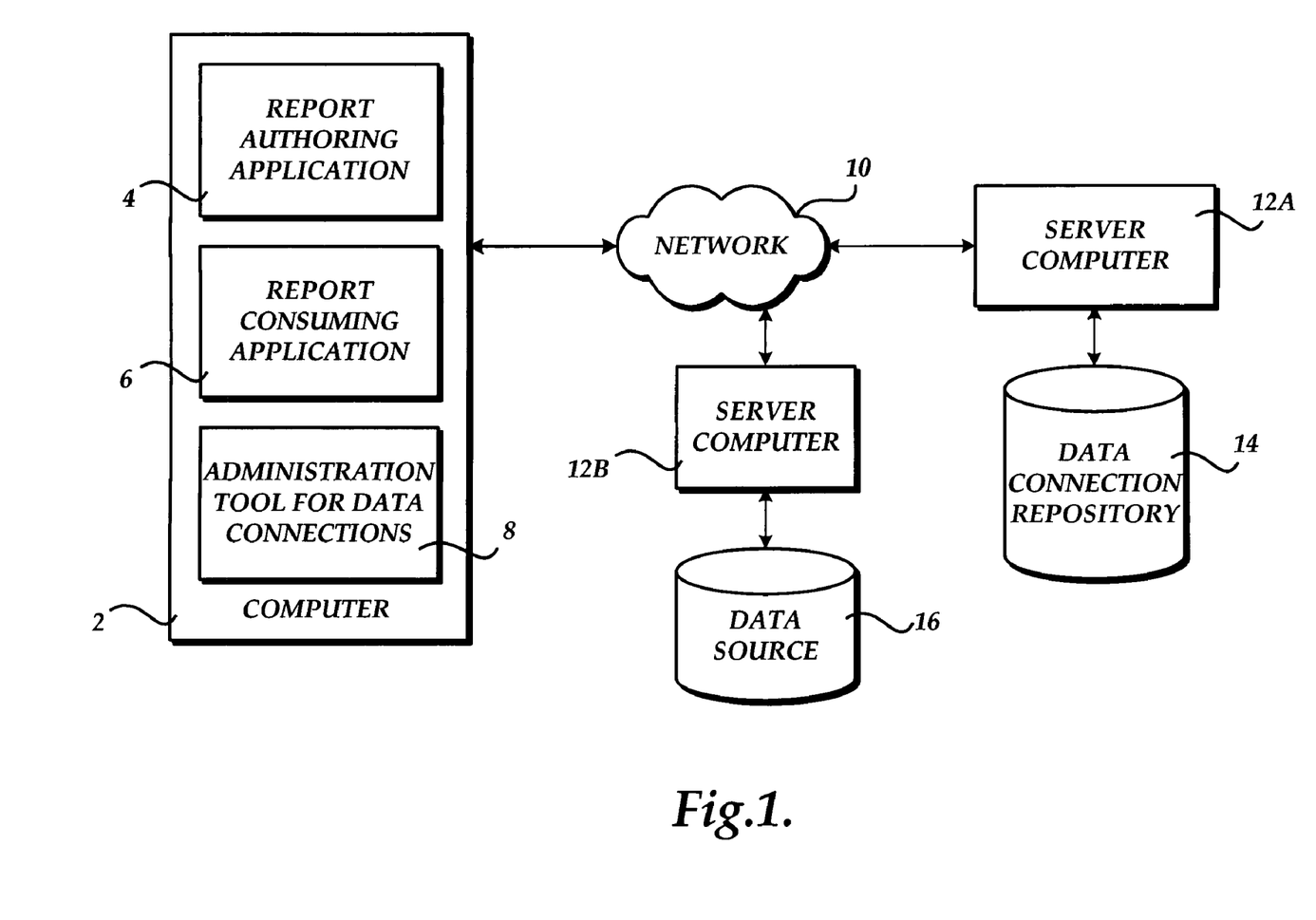
FIG. 1 is a computer network diagram illustrating an operating environment for embodiments of the invention.

As shown in FIG. 1, a number of computers may communicate via a distributed network 10, such as the Internet. In particular, a computer 2 may be connected to the Internet that includes a report authoring application 4 and a report consuming application 6. The report authoring application 4 comprises an application program for creating a data report. For instance, according to one embodiment of the invention, the report authoring application 4 comprises a spreadsheet application program, such as the EXCEL spreadsheet application program from MICROSOFT CORPORATION. For instance, a spreadsheet report may be created utilizing data from an external data source, such as the data source 16. As will be described in greater detail below, the data source 16 may comprise any type of database, including a relational database or an OLAP cube.

According to aspects of the invention, the computer 2 may also include a report consuming application 6. The report consuming application 6 may also comprise a spreadsheet application program such as the EXCEL spreadsheet application program from MICROSOFT CORPORATION. In order to consume data, the report consuming application 6 may load a previously authored report that includes a reference to an external data source. When the report is executed, data will be retrieved from the external data source and included in the financial calculations that comprise the report. It should be appreciated that the report authoring application 4 and the report consuming application 6 may comprise the same application program or different application programs. Moreover, it should be appreciated that the report authoring application 4 and the report consuming application 6 may comprise any program that connects to an external data source.

As shown in FIG. 1, a server computer 12B also connects to the network 10. The server computer 12B is operative to provide a gateway to the data source 16. The server computer 12B is also operative to receive and respond to requests for data stored within the data source 16. Accordingly, the server computer 12B may be operative to execute database software for providing access to the data contained in the data source 16 via the network 10. Such database software is well known to those skilled in the art.

As also shown in FIG. 1, a server computer 12A is also connected to the network 10. As will be described in greater detail throughout this document, the server computer 12A is operative to maintain a data connection repository 14. The data connection repository 14 comprises a centrally managed repository of data connection definitions. Each of the data connection definitions stored within the data connection repository 14 includes a data connection file that stores data for establishing a connection to a data source, such as the network address and the database location for the data source. For instance, with reference to the server computer 12B, the data connection repository 14 may store a data connection file that defines the network address of the server computer 12B and additional information necessary to connect to the data source 16.

According to embodiments of the invention, the data connection repository 14 may also store one or more metadata properties associated with each data connection file. The properties may include, for instance, a common name by which the data connection may be referred, a text description of the data connection, searchable key words for the data connection, instructions for obtaining credentials for accessing the data source, and other information.

According to other aspects of the invention, the server computer 12A may receive and respond to requests for data connection files stored in the data connection repository 14. For instance, when the report authoring application 4 is utilized to connect to a data source 16, the report authoring application 4 may request from the server computer 12A all of the data connection files available for connection. In response thereto, the server computer 12A may search the data connection repository 14 for the available data connection files and return a list of these files to the reporting authoring application 4. According to aspects of the invention, the search performed by the server computer 12A of the data connection repository 14 may be limited to data sources for which a user of the application 4 has security privileges. Alternatively, the search of the data connection repository 14 by the server computer 12A may be limited to data sources having metadata associated therewith that match filter terms provided by a user of the computer 2. When one or more data sources have been identified within the repository 14, the server computer 12A responds to the request with a list of the matching data sources.

Once the report authoring application 4 receives the list of available data sources, these data sources may be presented to a user of the computer 2. The list of data sources may also be sorted and filtered based on metadata associated with each source. When a user of the application 4 selects one of the data sources to connect to, the application program 4 transmits a request to the server computer 12A for the data connection file corresponding to the selected data source. In response thereto, the server computer 12A retrieves from the repository 14 the appropriate data connection file and returns the file to the report authoring application 4.

Once the data connection file has been returned to the computer 2, the application 4 may utilize the contents of the connection file to establish a connection to the data source 16. Data may then be retrieved from the data source and utilized in calculations performed by the application program 4. When a report is saved by the application program 4, a reference may be saved within the report to the data connection file. In particular, a link may be saved within the report to the data connection file located on the server computer. The data connection file may also be embedded within the saved report.

When a report that includes a reference to a data source is subsequently opened by the report consuming application 6, the application may be operative to determine whether the reference is a link or an embedded data connection file. If the reference is a link to a data connection file, a determination may be made by the application 6 as to whether the connection file is contained in the data connection repository 14. If the data connection file is not in the repository 14, the report consuming application 6 will load the report without establishing a connection to a data source. If, however, the data connection file is located in the repository 14, the data connection file is copied from the repository by the server computer 12A to the computer 2. The application 6 may then utilize the connection file to open a connection to the data source 16 and utilize data from the data source 16 within the report. If the reference to a data source in a report is determined to be an embedded data connection file, a sequence of operations are performed in order to determine whether the embedded data connection file should be utilized. The sequence of operations is described in greater detail below with respect to FIG. 5.

As shown in FIG. 1, the computer 2 may also include an administration tool for data connections 8. The administration tool 8 allows an administrator to manage the contents of the data connection repository 14. In particular, the system administrator may define new connections, modify properties of existing connections, and specify groups of users that should be permitted to view available connections. In this manner, certain connections may be exposed to certain groups of users while other connections are not. It should be appreciated that the administration tool 8 may comprise a stand alone application executing on the computer 2 or another type of application execution on the server computer 12A. For instance, the server computer 12A may provide a hyper-text markup language ("HTML") interface for managing the contents of the data connection repository 14. Other types of interfaces may also be provided for managing the data connection files stored within the data connection repository 14.

Figure 2:
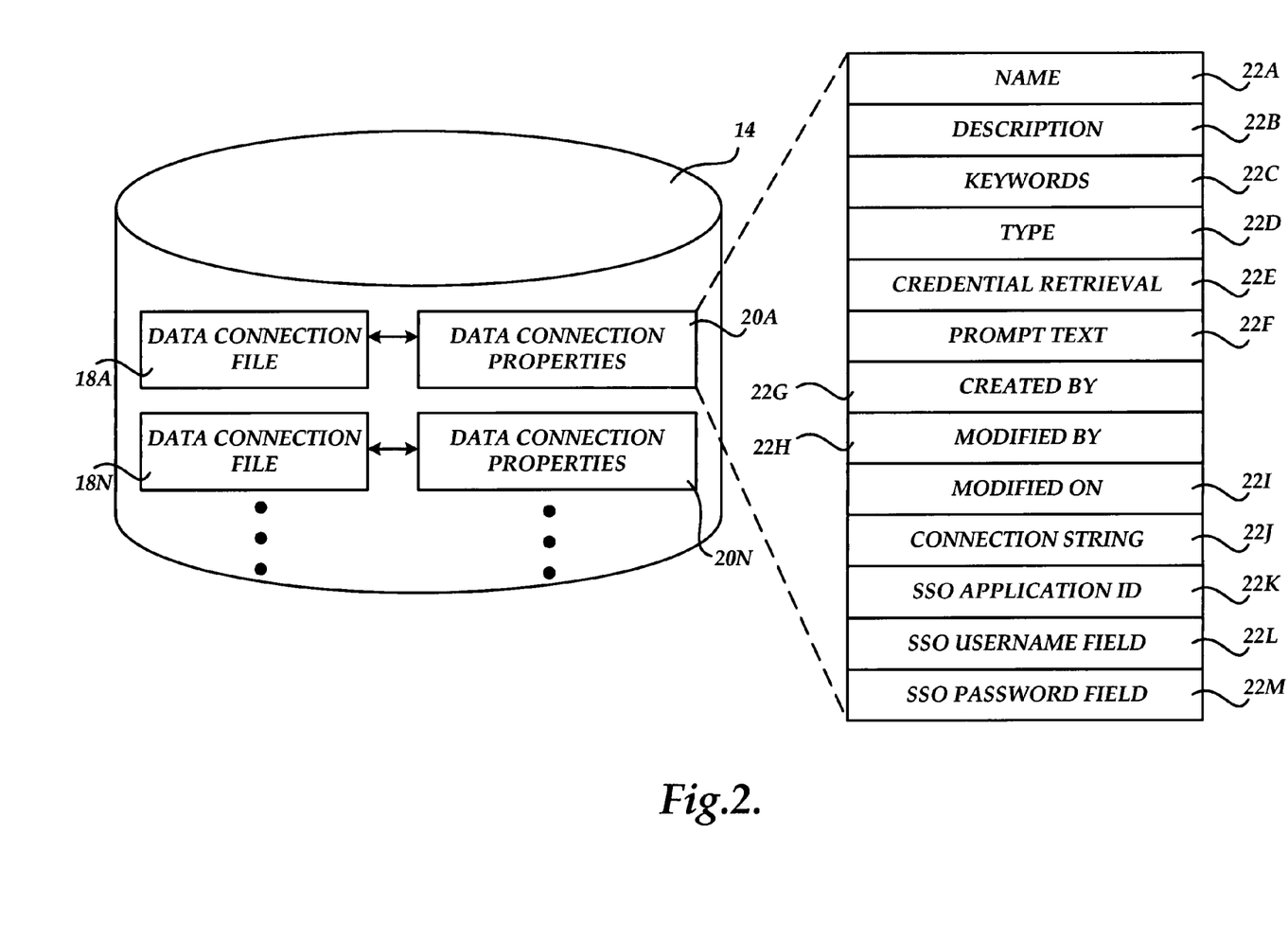
FIG. 2 is a database diagram illustrating the structure and content of a centrally managed repository for data connection definitions utilized by the various embodiments of the invention.

Referring now to FIG. 2, additional details regarding the contents of the data connection repository 14 will be provided. As discussed briefly above, the repository 14 is operative to store data connection files 18A-18N. The data connection files 18A-18N store the data necessary to connect to a data source 16. In particular, the data connection file 18A may store a network address of a server computer 12B hosting a data source 16. Additionally, the data connection file 18A may store additional data identifying the particular data source 16 available at this server computer 12B. Other information may also be stored in the data connection file 18A necessary in order to obtain a connection to the data source 16.

According to the various embodiments of the invention, data connection properties 20A-20N are also stored that correspond to each data connection file 18A-18N. As shown in FIG. 2, the data connection properties 20A define metadata for the data connection file 18A. In particular, according to one embodiment of the invention presented herein, the metadata includes a friendly name 22A of the data connection, a text description 22B of the data connection, and one or more keywords 22C that may be utilized by a user of the computer 2 to search for a specific connection. The keywords 22C may be filtered upon by the server computer 12A when identifying the data connection files that should be returned to the computer 2.

The metadata stored within the data connection properties 20A may also include a type field 22D that identifies the data source or provider type, such as OLEDB, ODBC, SOAP, etc. The contents of the type field 22D may be utilized to determine whether an associated provider is supported. According to embodiments of the invention, a credential retrieval field 22E may also be provided within the metadata for describing the type of credentials necessary to access the specific data source. For instance, this field may store one of four values indicating whether the user should be prompted for credentials, whether no credentials are required to access the data source, whether the credentials are integrated, such as through the use of the Kerberos network authorization protocol or whether the credentials are stored in another location. In this regard, a prompt text field 22F may be utilized to specify the text displayed with a prompt for user supplied credentials. For instance, a user may be prompted to enter their employee identification number and user name for the credentials to access a database.

The data connection properties 20A may also store a created by field 22G identifying the user that created the data connection file, a modified by field 22H that identifies the user that last modified the data connection file and a modified on field 22I that identifies the last date upon which the data connection file was modified. The data connection properties 20A may also store the connection string 22J needed to establish a connection with the data source 16. The connection string 22J may be copied from the contents of the corresponding data connection file. According to embodiments of the invention, the data connection properties 20A may also store a single sign-on service ("SSO") application ID field 22K, SSO user name field 22L, and SSO password 22M. The contents of these fields are utilized when the value of the credential retrieval field 22E is set to utilize stored credentials. These fields identify the stored credential service and the user name and password that should be utilized to gain access to the data source 16. It should be appreciated that other types of metadata may also be stored within the data connection properties 20A and utilized herein. For example, other types of metadata may include QueryTimeOut and DataCacheLifetime fields (not shown), which identify values that allow the server computer to override default settings to accommodate settings specific to a data connection, and a Location field (not shown) which stores the name of the server computer for databases. It will be appreciated the Location field may be useful for the administration of connections on the server computer. Additional metadata for describing a query (such as command text, update, insert, delete, and select) may also be stored within the data connection properties 20A.

Figure 3:
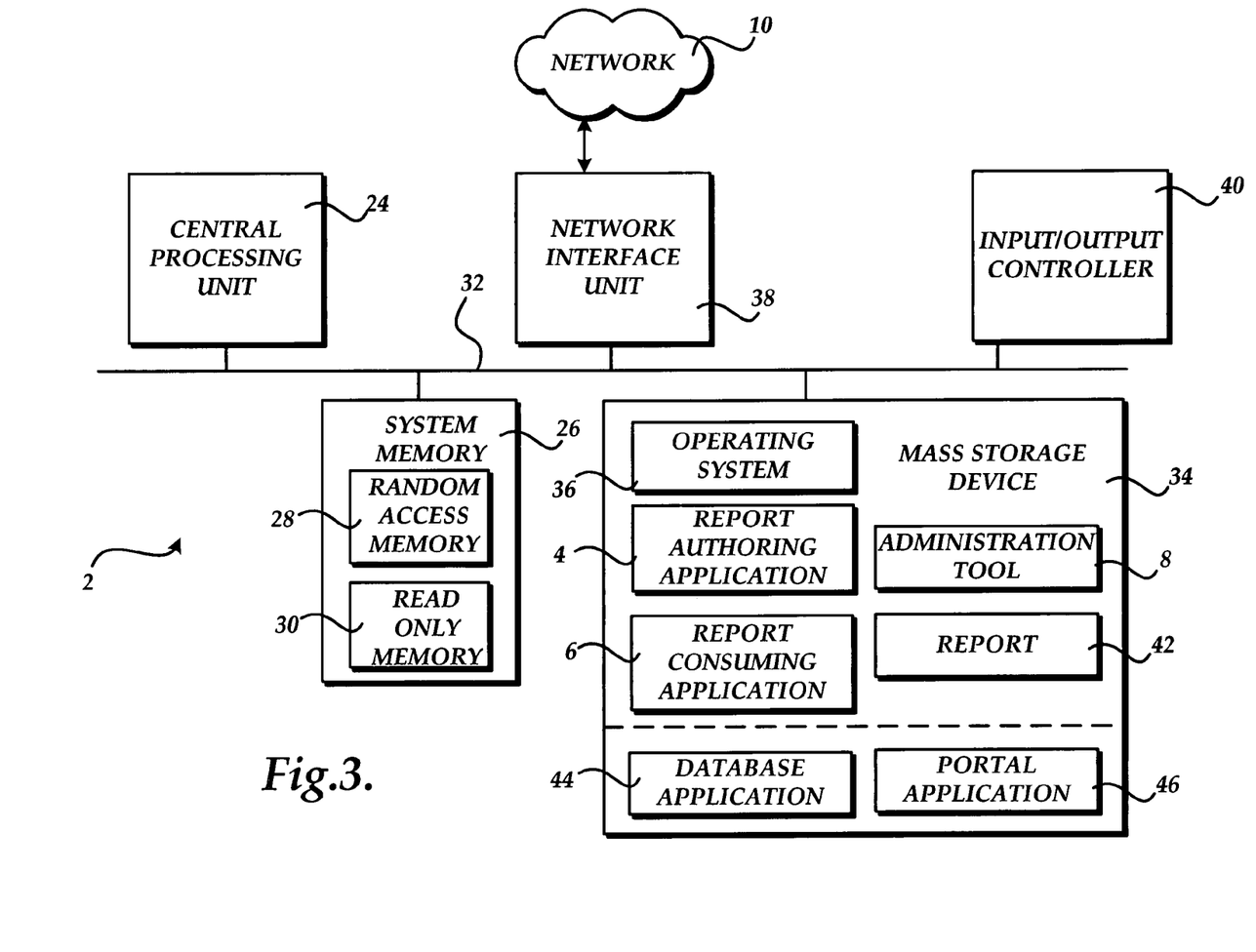
FIG. 3 is a computer system architecture diagram illustrating a computer system utilized in and provided by the various embodiments of the invention.

Referring now to FIG. 3, an illustrative computer architecture for a computer 2 utilized in the various embodiments of the invention will be described. The computer architecture shown in FIG. 3 illustrates a conventional general purpose computer, including a central processing unit 24 ("CPU"), a system memory 26, including a random access memory 28 ("RAM") and a read-only memory ("ROM") 30, and a system bus 32 that couples the memory to the CPU 24. A basic input/output system containing the basic routines that help to transfer information between elements within the computer, such as during startup, is stored in the ROM 30. The computer 2 further includes a mass storage device 34 for storing an operating system 36, application programs, and other program modules, which will be described in greater detail below.

The mass storage device 34 is connected to the CPU 24 through a mass storage controller (not shown) connected to the bus 32. The mass storage device 34 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 10, such as the Internet. The computer 2 may connect to the network 10 through a network interface unit 38 connected to the bus 32. It should be appreciated that the network interface unit 38 may also be utilized to connect to other types of networks and remote computer systems. The computer 2 may also include an input/output controller 40 for receiving and processing input from a number of other devices, including a keyboard, mouse, or electronic stylus (not shown in FIG. 1). Similarly, an input/output controller 40 may provide output to a display screen, a printer, or other type of output device.

As mentioned briefly above, a number of program modules and data files may be stored in the mass storage device 34 and RAM 28 of the computer 2, including an operating system 36 suitable for controlling the operation of a networked personal computer, such as the WINDOWS XP operating system from MICROSOFT CORPORATION of Redmond, Wash. The mass storage device 34 and RAM 28 may also store one or more program modules. In particular, the mass storage device 34 and the RAM 28 may store a report authoring application 4 and a report consuming application 6. According to one embodiment of the invention, these applications comprise the EXCEL spreadsheet application program from MICROSOFT CORPORATION. It should be appreciated, however, that other application programs from other manufacturers may be utilized to embody the various aspects of the present invention.

As shown in FIG. 3, the mass storage device 34 may also store a report 42. In embodiments of the invention described herein, the report 42 comprises a spreadsheet file that includes a reference to a data source external to the computer 2. By utilizing a reference to an external data source, the report 42 may utilize data contained within external databases when performing different kinds of analysis.

As shown in FIG. 3, the mass storage device 34 may also store an administration tool 8. As discussed briefly above, the administration tool 8 may provide functionality for centrally managing the data connection files stored in the repository 14.

Data connection files may be added or removed to the repository utilizing the administration tool 8. Additionally, the contents of data connection files may be modified and their associated metadata stored in the data connection properties 20A may also be changed. Additionally, through the use of the administration tool 8, a system administrator may classify groups of people or individuals authorized to view the particular data connection files. In this way groups, or audiences, may be created for particular data connection files.

It should be appreciated that the server computers 12A and 12B shown in FIG. 1 may include many of the conventional components shown with respect to the computer 2 in FIG. 3. Additionally, the server computer 12A may include a portal application 46 for receiving and responding to requests to access the data connection files stored in the repository 14. The portal application 46 may perform the necessary functions to provide data connection files only to authorized users, to filter searches of the data connection repository 14, and to otherwise receive and respond to requests from the computer 2 for access to the repository 14. Additionally, the portal application 46 may provide a HTML interface for administering the contents of the data connection repository 14. The functions described above with reference to the administration tool 8 may be performed through a web based interface provided by the portal application 46. According to one embodiment of the invention, the portal application 46 comprises the WINDOWS SHARE POINT services server application from MICROSOFT CORPORATION.

As shown in FIG. 3, the server computer 12B may also include a database application 44. As known to those skilled in the art, the database application 44 is operative to receive and respond to requests for connections to the data source 16. It should be appreciated that the server computer 12B may include other conventional software such as the operating system 36 and other components known to those skilled in the art.

Figure 4:
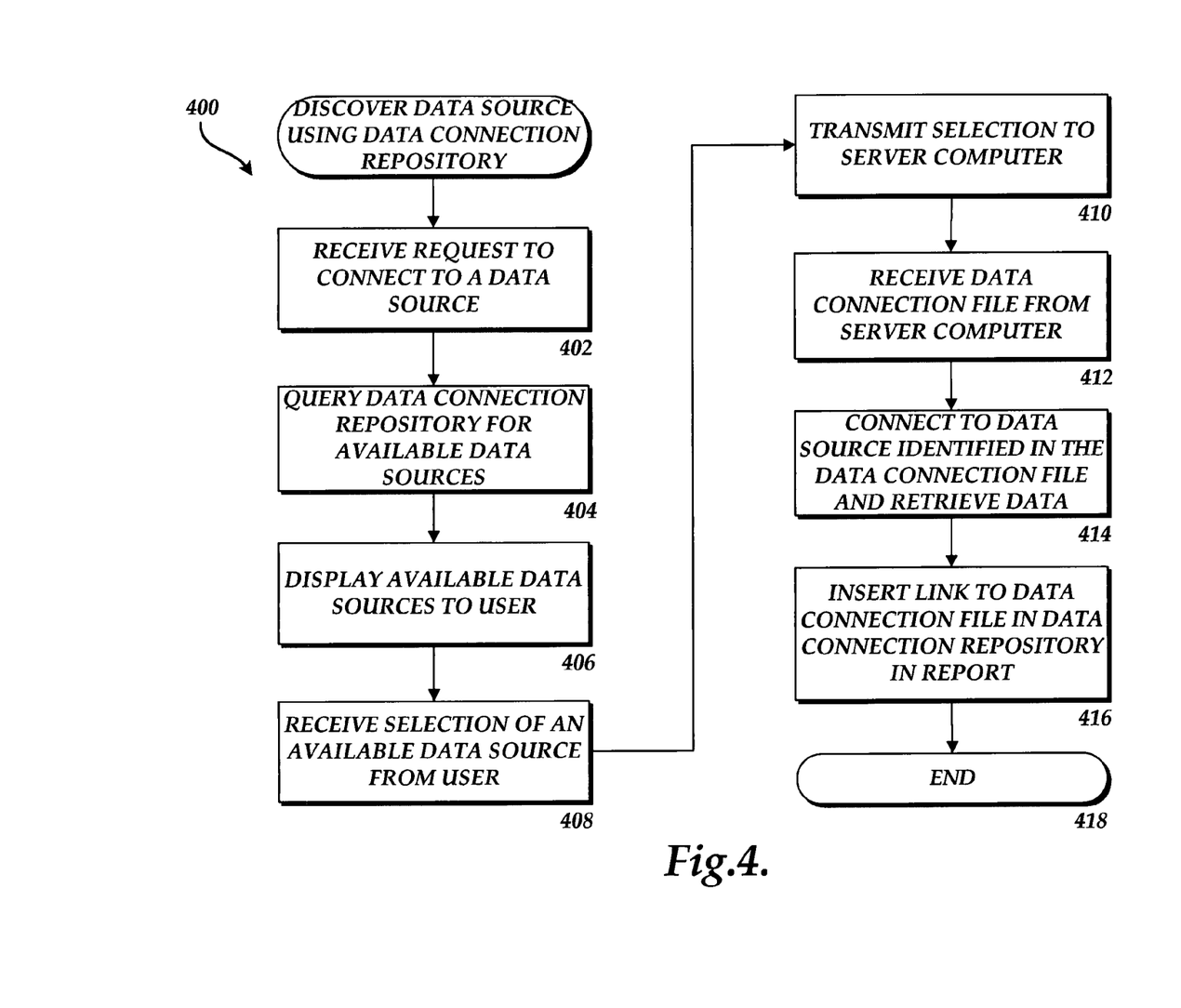
FIG. 4 is a flow diagram illustrating a method for discovering a data source utilizing a data connection repository.

Referring now to FIG. 4, an illustrative routine 400 will be described illustrating a process for discovering a data source using a data connection repository. It should be appreciated that although the embodiments of the invention described herein are presented in the context of a spreadsheet application program, the invention may be utilized with any type of application program that connects to a data source. For instance, the embodiments of the invention described herein may be utilized within a presentation application program, a drawing or computer-aided design application program, a word processing application program, or a database application program.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring now to FIG. 4, an illustrative routine 400 will be described for discovering available data sources utilizing the contents of the data connection repository 14. The routine 400 begins at operation 402, where the report authoring application 4 receives a request to connect to a data source. Such a request may be received programmatically or from a user. In response to such a request, the report authoring application 4 transmits a query to the server computer 12A requesting the identity of the available data sources at operation 404. The query may include the identity of the user of the report authoring application 4 and one or more filter terms provided by the user for filtering the contents of the data connection repository 14.

Utilizing the information provided by the report authoring application 4 in the query, the server computer 12A is operative to search the contents of the data connection repository 14 for data connection files to which the user of the computer 2 is authorized to access and which match any filter terms provided by the user. It should be appreciated that the metadata stored within the data connection properties 20A-20N for each data connection file 18A-18N may be searched by the server computer 12A to identify the list of data connection properties to which the user is authorized to view and which match any filter terms provided by the user. Once the list of available data connection files has been determined by the server computer 12A, a list of the files is returned to the report authoring application for executing on the computer 2.

At operation 406, the report authoring application 4 is operative to display a list of the available data sources to the user of the computer 2. The user may then be prompted to select one of the available data sources from the displayed list. At operation 408, the report authoring application 4 receives from the user the selection of an available data source. In response to receiving such a selection, the report authoring application 4 transmits the identity of the selected data connection file to the server computer 12A at operation 410.

In response to receiving the identity of a particular data connection file, the server computer 12A is operative to retrieve the data connection file from the data connection repository 14 and to transmit the data connection file, including the information necessary to connect to the data source, to the report authoring application 4. The report authoring application 4 receives the data connection file from the server computer 12A at operation 412.

Once the data connection file has been received by the computer 2, the contents of the data connection file may be utilized to connect to the data source, such as the data source 16, identified by the data contained within data connection file. Once the connection has been opened, the report authoring application 4 may retrieve data from the data source and utilize the data in the report 42.

When a user of the report authoring application 4 elects to save the report, a link to the data connection file may be saved within the report. The link to the data connection file does not contain the data necessary to connect to the data source 16. Rather, the link to the data connection file contains a link to the server computer 12A and the identity of the data connection file stored in the data connection repository 14. By utilizing the link to the data connection file stored in the repository 14 when the document is opened, the data connection file only needs to be modified to update all reports that reference it. Alternatively, the data connection file may be embedded within the report. The process of linking to the data connection file or embedding the data connection file within the file occurs at operation 416. Once this process has been performed, the routine 400 continues to operation 418, where it ends.

Figure 5:
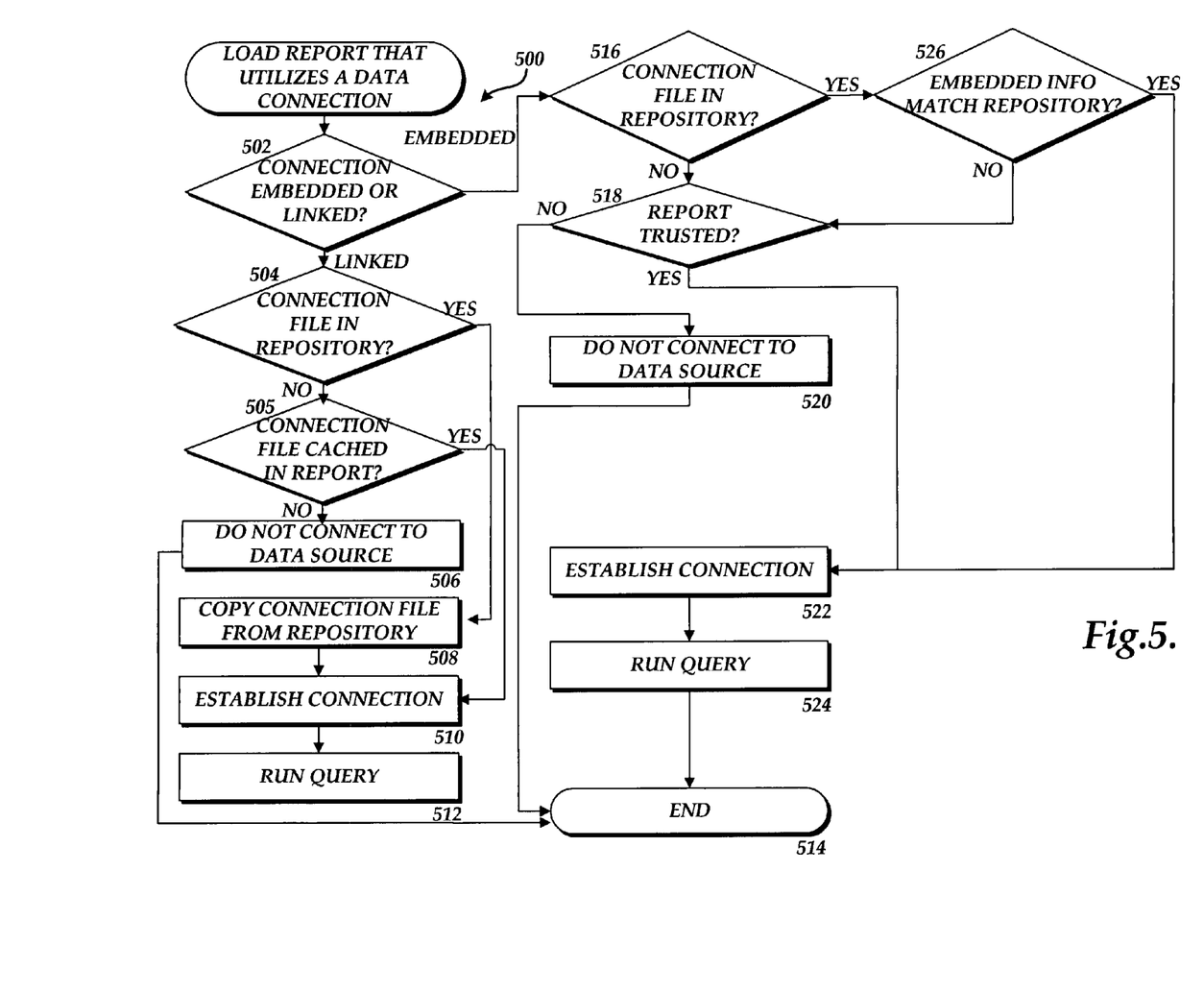
FIG. 5 is a flow diagram illustrating aspects of the invention for loading and utilizing a report that includes a reference to a data source.

Turning now to FIG. 5, an illustrative routine 500 will be described for loading and executing a report that includes a connection to a data source. For instance, this process may be performed when the report consuming application 6 is utilized to load and execute a report 42 that includes a connection to the data source 16. Once a report has been identified and loaded, the routine 500 begins at operation 502, where the report consuming application 6 determines whether the reference to the data connection has been embedded within the report or whether a link has been created to a data connection file in the repository 14. If a link has been made to a data connection file stored in the data connection repository 14, the routine 500 continues to operation 504. At operation 504, a request is transmitted from the report consuming application 6 to the server computer 12A to determine whether the connection file is contained within the data connection repository 14. If the data connection file linked within the report is not contained within the data connection repository 14, the routine 500 continues from operation 504 to operation 505. At operation 505 the report consuming application 6 determines whether the information in the connection file is cached in the report. If the information in the connection file is cached in the report, the routine 500 branches from operation 505 to operation 510 where the report consuming application 6 utilizes the cached information in the connection file to establish a connection to the data source 16. However, if the information in the connection file is not cached in the report, the routine 500 branches from operation 505 to operation 506. At operation 506, no connection is made to a data source. However, if the data connection file linked in the report is contained in the repository 14, the routine 500 branches from operation 504 to operation 508.

At operation 508, a request is made for the appropriate data connection file from the server computer 12A. When the data connection file is received at the report consuming application 6, it is utilized to created a connection to the data source 16 at operation 510. Once the connection with the data source 16 has been established and data may be transmitted, the query contained within the report 512 is executed by the report consuming application 6. From operation 512, the routine 500 continues to operation 514, where it ends.

If, at operation 502, it is determined that the data connection file is embedded within the report, the routine 500 branches from operation 502 to operation 516. At operation 516, the report consuming application 6 transmits a request to the server computer 12A to determine whether the embedded connection file is contained within the repository 14. If the embedded data connection file is contained within the repository 14, the routine 500 branches from operation 516 to operation 526. At operation 526, the report consuming application 6 determines whether the information embedded within the report matches the contents of the data connection file stored in the repository 14. If the contents of the embedded data connection file matches the contents of the data connection file stored in the repository 14, the routine 500 branches from operation 526 to operation 522, where the report consuming application 6 utilizes the contents of the embedded data connection file to establish a connection to the data source 16. At operation 524, the query contained in the report is executed by the report consuming application 6. The routine then continues to operation 514, where it ends.

If, at operation 516, it is determined that the embedded connection file is not contained in the repository 14, or if at operation 526 it is determined that embedded data connection file does not match the data stored in the repository 14, the routine 500 continues to operation 518. At operation 518, the report consuming application 6 determines whether the report is trusted. A file is trusted if it is saved in a secure location that only highly privileged users (such as administrators or users granted administrative rights) have permission to save to, but to which other less privileged users have only read only access. If the report is not trusted, the routine 500 branches to operation 520, where no connection is made to a data source. If, however, the report is trusted, the routine 500 continues from operation 518 to operation 522 where the connection to the data source 16 is established as set forth in the embedded data connection file and the query is executed at operation 524. From operations 520 and 524, the routine 500 continues to operation 514, where it ends.

Based on the foregoing, it should be appreciated that the various embodiments of the invention include a method, system, apparatus, and computer-readable medium for discovering and connecting to data sources. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for discovering and connecting to a data source, comprising:

receiving, by the computer, a request to connect to a data source, wherein the request to connect to a data source comprises a request to connect to a data source to obtain data for use in a report;

in response to the request, transmitting, by the computer, a request to a centrally managed data connection repository for a list of available data sources;

receiving, by the computer, the list of available data sources from the centrally managed data connection repository and displaying the list;

receiving, by the computer, the selection of one of the available data sources from the displayed list;

transmitting, by the computer, the identity of the selected data source to the centrally managed data connection repository;

in response to transmitting the identity of the selected data source, receiving, by the computer, from the repository a data connection file having data stored therein for establishing a connection to the selected data source and metadata describing one or more properties for the data source, wherein the metadata comprises a credential field for describing credentials to access the data source, the credentials comprising a plurality of values indicating whether a user should be prompted for the credentials, whether no credentials are required to access the data source, whether the credentials are integrated, or whether the credentials are stored in another location;

utilizing, by the computer, the data stored in the data connection file to establish a connection to the selected data source;

storing, by the computer, a link in the report to the connection file stored in the centrally managed data connection repository;

receiving, by the computer, a request to open the report;

in response to the request, determining, by the computer, whether the connection file identified by the link is contained in the centrally managed data connection repository;

in response to determining that the connection file identified by the link is not in the centrally managed data connection repository, loading, by the computer, the report without establishing a connection to the data source; and in response to determining, by the computer, that the connection file identified by the link is not in the centrally managed data connection repository and the data in the connection file is cached in the report, then utilizing, by the computer, the data in the connection file to establish a connection to the data source.

2. The method of claim 1 further comprising:
in response to determining that the connection file identified by the link is in the centrally managed data connection repository,
copying, by the computer, the connection file from the centrally managed data connection repository,
utilizing, by the computer, the data stored in the data connection file to establish a connection to the selected data source, and
executing, by the computer, the report.

3. The method of claim 1 further comprising embedding, by the computer, the connection file in the report.

4. The method of claim 3, further comprising:
in response to the request, determining, by the computer, whether the connection file embedded in the report is contained in the centrally managed data connection repository;
in response to determining that the embedded connection file is in the centrally managed data connection repository, utilizing, by the computer, the data stored in the embedded data connection file to establish a connection to the selected data source, and executing the report.

5. The method of claim 4, further comprising:
in response to determining that the embedded connection file is not in the centrally managed data connection repository, determining, by the computer, whether the report is trusted;
in response to determining that the report is trusted, utilizing, by the computer, the data stored in the embedded data connection file to establish a connection to the selected data source, and executing, by the computer, the report; and
in response to determining that the report is not trusted, loading, by the computer, the report without establishing a connection to the data source.

6. A system for providing discovery of data sources, the system comprising:
a server computer operative to maintain a centrally managed repository for data connection definitions, the data connection definitions comprising a data connection file having data stored therein for establishing a connection to a data source and metadata describing one or more properties for the data source, the metadata comprising a credential field for describing credentials to access the data source, the credentials comprising a plurality of values indicating whether a user should be prompted for the credentials, whether no credentials are required to access the data source, whether the credentials are integrated, or whether the credentials are stored in another location; and
a client computer operative to execute an application program for consuming data from the data source, the application program further operative to:
receive a request to connect to the data source, wherein the request to connect to the data source comprises a request to connect to the data source to obtain data for use in a report;
in response to the request, transmit a request to the centrally managed data connection repository for a list of available data sources;
receive the list of available data sources from the centrally managed data connection repository and displaying the list;
receive the selection of one of the available data sources from the displayed list;
transmit the identity of the selected data source to the centrally managed data connection repository;
in response to transmitting the identity of the selected data source, receive from the repository the data connection file;
utilize the data stored in the data connection file to establish a connection to the selected data source;
store a link in the report to the connection file stored in the centrally managed data connection repository;
receive a request to open the report;
in response to the request, determine whether the connection file identified by the link is contained in the centrally managed data connection repository;
in response to determining that the connection file identified by the link is not in the centrally managed data connection repository, load the report without establishing a connection to the data source; and
in response to determining that the connection file identified by the link is not in the centrally managed data connection repository and in response to a determination that the data in the connection file is cached in the report, then utilize data in the connection file to establish a connection to the data source.

7. The system of claim 6, wherein the server computer is further operative to determine the list of available data sources from the centrally managed repository based on one or more filter terms provided with the request for the list of available data sources.

8. The system of claim 6, wherein the client computer is further operative to execute an application program for managing the contents of the centrally managed repository located at the server computer.

9. A computer-readable storage medium having computer-executable instructions stored thereon which, when executed by a computer, will cause the computer to perform a method for discovering and connecting to a data source, the method comprising:
receiving a request to connect to a data source, wherein the request to connect to a data source comprises a request to connect to a data source to obtain data for use in a report;
in response to the request, transmitting a request to a centrally managed data connection repository for a list of available data sources from the displayed list;
receiving the list of available data sources from the centrally managed data connection repository and displaying the list;
receiving the selection of one of the available data sources from the displayed list;
transmitting the identity of the selected data source to the centrally managed data connection repository;
in response to transmitting the identify of the selected data source, receiving from the repository a data connection file having data stored therein for establishing a connection to the selected data source and metadata describing one or more properties for the data source, wherein the metadata comprises a credential field for describing credentials to access the data source, the credentials comprising a plurality of values indicating whether a user should be prompted for the credentials, whether no credentials are required to access the data source, whether the credentials are integrated, or whether the credentials are stored in another location;

utilizing the data stored in the data connection file to establish a connection to the selected data source;

storing a link in the report to the connection file stored in the centrally managed data connection repository;

receiving a request to open the report:

in response to the request, determining whether the connection file identified by the link is contained in the centrally managed data connection repository;

in response to determining that the connection file identified by the link is not in the centrally managed data connection repository, loading the report without establishing a connection to the data source; and in response to determining that the connection file identified by the link is not in the centrally managed data connection repository and the data in the connection file is cached in the report, then utilizing the data in the connection file to establish a connection to the data source.

* * * * *